(12) United States Patent
Gulas

(10) Patent No.: US 7,779,948 B2
(45) Date of Patent: Aug. 24, 2010

(54) VEHICLE

(75) Inventor: Stefan Gulas, Berlin (DE)

(73) Assignee: Spinwood Trading & Consulting Ltd., Limassol (CY)

( * ) Notice: Subject to any disclaimer, the term of this patent is extended or adjusted under 35 U.S.C. 154(b) by 115 days.

(21) Appl. No.: 11/920,268

(22) PCT Filed: May 15, 2006

(86) PCT No.: PCT/AT2006/000201

§ 371 (c)(1),
(2), (4) Date: Dec. 20, 2007

(87) PCT Pub. No.: WO2006/119531

PCT Pub. Date: Nov. 16, 2006

(65) Prior Publication Data

US 2009/0095552 A1    Apr. 16, 2009

(30) Foreign Application Priority Data

May 13, 2005  (AT) .............................. A 0832/2005
Aug. 16, 2005  (AT) .............................. A 1373/2005

(51) Int. Cl.
    *B62K 11/02*  (2006.01)
(52) U.S. Cl. ..................... 180/205; 180/206; 180/207
(58) Field of Classification Search .............. 180/205, 180/206, 207
See application file for complete search history.

(56) References Cited

U.S. PATENT DOCUMENTS

| | | | |
|---|---|---|---|
| 3,884,317 A | 5/1975 | Kinzel et al | |
| 4,410,060 A * | 10/1983 | Cunard | 180/205 |
| 5,226,501 A * | 7/1993 | Takata | 180/206 |
| 6,276,479 B1 * | 8/2001 | Suzuki et al. | 180/207 |
| 6,516,908 B2 * | 2/2003 | Tseng | 180/206 |
| 6,554,730 B1 * | 4/2003 | Sakai et al. | 475/195 |
| 6,629,574 B2 * | 10/2003 | Turner | 180/206 |
| 6,672,418 B1 * | 1/2004 | Makino | 180/205 |
| 6,874,592 B2 * | 4/2005 | Yokotani et al. | 180/205 |
| 7,156,780 B1 | 1/2007 | Fuchs et al. | |
| 2003/0141126 A1 * | 7/2003 | Hays et al. | 180/207 |
| 2006/0065452 A1 * | 3/2006 | Tomoshige et al. | 180/65.1 |
| 2006/0283644 A1 * | 12/2006 | Matsueda | 180/205 |
| 2008/0308336 A1 * | 12/2008 | van Rooij | 180/205 |

FOREIGN PATENT DOCUMENTS

EP   0784008   7/1999

OTHER PUBLICATIONS

English Abstract of EP0784008.

* cited by examiner

*Primary Examiner*—Lesley Morris
*Assistant Examiner*—Marlon A Arce
(74) *Attorney, Agent, or Firm*—Dykema Gossett PLLC

(57) ABSTRACT

The invention relates to a vehicle, especially a bicycle, comprising at least one drive wheel (1), a motor (3) connected to the drive wheel (1), a power accumulator (5) for supply of the motor (3), a control device (6) for controlling the motor (3), and a pedal crank (7). The aim of the invention is to improve the handling characteristics of such a bicycle. For this purpose, the pedal crank (7) can be moved independently of the drive wheel (1) and is connected to a braking device (20, 21) that provides a moment of resistance to the rotation of the pedal crank (7). The moment of resistance of the braking device (20, 21) is controlled by the control device (6).

25 Claims, 3 Drawing Sheets ically driven vehicle which is as realistic as possible may be achieved at acceptable outlay.

VEHICLE

BACKGROUND OF THE INVENTION

1. Field of the Invention

The present invention relates to a vehicle, in particular a bicycle, having at least one drive wheel, a motor which is connected to the drive wheel, a power accumulator for supplying the electric motor, a control unit for controlling the electric motor, and a pedal crank.

2. The Prior Art

Various vehicles are known which may be driven on one hand using muscle force and on the other hand using an auxiliary drive. These are typically electric bicycles, which have a pedal crank, which is connected via a drive chain to the rear wheel, and are additionally equipped with an electric motor, which may be used alternatively or additionally to the muscle drive. Such solutions have the disadvantage that in the event of mixed operation, the travel velocity is related only indirectly or not at all to the drive torque which is applied to the pedal crank. The driver of such a bicycle must therefore both control the electric motor via a regulator and also perform an appropriate adaptation of the pedal power to be able to produce the particular desired velocity as a function of slopes, gradients, and wind conditions. Furthermore, a bicycle is known from U.S. Pat. No. 3,884,317 A, which has an electric drive in the pedal crank, which drives a generator and is no longer connected to the wheels, however. In addition thereto, current may be fed from a battery into the system, so that the electric drive motor is partially supplied with the current which the driver generates via the pedal crank on the generator and partially by the current taken from the battery. Using such a bicycle, the travel velocity may be largely controlled by the power applied to the pedal crank within predefined limits. This results in simplified operation for the user in comparison to the prior solution. Through corresponding shifting of the generator, an attempt is made to produce an approximately natural behavior of such a bicycle in comparison to a mechanically driven vehicle, i.e., that the speed of the drive crank corresponds to the speed of the drive wheel within one gear setting. However, it has been shown that this requirement is only to be achieved to some extent in stationary or nearly stationary operation. In transition states, i.e., in transient operation, a bicycle of this type differs significantly from a typical bicycle, which has an unpleasant effect on the drivability.

To compensate for these existing disadvantages, in particular when starting, a solution has been suggested in WO 00/59773 A, in which the generator is activated by a control unit in such a way that a high resistance torque brakes the pedal crank when starting. In this way, the behavior of a vehicle may approach that of a mechanically driven vehicle. To be able to achieve sufficiently precise and realistic adaptation, a very high outlay is required for this solution, however, which particularly comprises complex power electronics for activating the generator. To be able to apply the appropriate resistance torques, the generator must be implemented as correspondingly large and high-performance. Such solutions have not been successful because of the required outlay.

A further known solution is described in EP 0 784 008 A. A generator is also driven by the pedal crank here to obtain electrical current for the propulsion of a bicycle. Additional current sources such as a generator driven by an internal combustion engine, solar cells, or rechargeable batteries may also be provided here. This solution also requires complex power electronics to be able to appropriately control the torque to be applied to the generator on one hand and the drive on the other hand.

The object of the present invention is to refine a vehicle of the type described above in such a way that simulation of the behavior of a mechanically driven vehicle which is as realistic as possible may be achieved at acceptable outlay.

A further object of the present invention is to produce largely natural behavior of such a vehicle in comparison to a mechanically driven vehicle, i.e., within one shift setting, the speed of the pedal crank is related to the travel velocity in a way comprehensible to the user of the vehicle. It has been shown that in particular with high-performance drives in transition states, i.e., in transient operation, high oscillations of the drive torque are to be observed, which negatively influence the driving behavior. Such oscillations are to be largely avoided with the solution according to the present invention.

SUMMARY OF THE INVENTION

These objects are achieved according to the present invention in that the pedal crank is movable independently of the drive wheel and is connected to a braking unit, which opposes the rotation of the pedal crank with a resistance torque, and the resistance torque of the braking unit is controlled by the control unit. It is essential in the present invention that a braking unit is provided which dissipates at least a part of the energy applied to the pedal crank. In contrast to the devices of the prior art, the pedal crank is thus not primarily used for generating a part of the drive energy, but rather primarily for controlling the travel velocity of the vehicle. If necessary, relatively high resistance torques may be provided at the crankshaft using relatively simple means, to be able to simulate starting up on a hill realistically, for example. It is of special advantage if the braking unit comprises a flywheel mass in the form of a flywheel. The control is significantly simplified by providing a flywheel mass, because the flywheel mass automatically opposes a change of the speed of the crankshaft with resistance by its inertia.

The mass of the flywheel mass may be reduced in an especially advantageous way in that the flywheel mass is connected to the pedal crank via a gear increasing the speed, which preferably has a transmission ratio of at least 1:3. In this way, it is possible to implement the vehicle as especially light.

A particularly realistic simulation of a typical bicycle may be achieved in that the control unit is implemented in such a way that the ratio of the speed of the pedal crank to the speed of the drive wheel is constant step-by-step. The individual gear steps are activated by a shifter which may be actuated in the same way as the gear shifter of a mechanically driven bicycle. However, it is different in this case that the shifter does not change the transmission ratio of the mechanical transmission, but rather solely influences the behavior of the control unit. Alternatively thereto, it is also possible that the control unit is implemented in such a way that the ratio of the speed of the pedal crank to the speed of the drive wheel corresponds variably to a predefined value step-by-step. In this way, a vehicle having a continuously variable transmission may be simulated.

In an especially favorable embodiment variant of the present invention, the control unit is implemented for the purpose of keeping the power applied to the pedal crank at a constant ratio to the power delivered at the drive wheel. With a controller of this type, the particular driving state of the vehicle is recognizable from the resistance which is applied to the pedal crank. This means that a higher resistance is perceivable at the pedal crank when traveling uphill than with a tailwind, for example. This allows a still further correspondence of the travel feeling to mechanically driven vehicles than is the case with the solutions described above.

In an especially favorable embodiment variant of the present invention, the control unit controls the motor as a function of the torque instantaneously applied to the pedal crank, and/or a variable related thereto, such as power or speed, using chronological smoothing. In general, the torque which is to be applied to the pedal crank to achieve a specific speed of the pedal crank rises with the speed. Therefore, it is also possible to use the speed of the pedal crank as a signal characterizing the torque, or also the power applied to the pedal crank. In this way, it is possible to control the power of the motor which drives the vehicle very finely by the actuation of the pedal crank. With this solution, the difficulties arising in the case of higher motor powers in particular are avoided, which result from the variables which do not typically remain uniform over the crank rotation of the pedal crank, such as torque and speed. In the course of 360° crank revolution, the rotational angle changes and the legs are alternately loaded and relieved by the changed lever ratios. This has the result that during the entire revolution, torque and speed oscillate in a wave, even if the driver concentrates on pedaling uniformly. Oscillations in the drive power of the pedal crank, which would result in typical vehicles in oscillations of the drive power of the motor if they were equipped with a sufficiently strong motor, are compensated for by the present embodiment variants. In such vehicles, it would be very difficult to achieve a continuously uniform mode of travel and keep a specific velocity uniformly, because the motor would have analog oscillations in the delivered torque in accordance with the oscillations occurring in the crankshaft. With strong motors, an effect occurs in this regard, which comprises the oscillations of the drive torque of the motor being accompanied by corresponding accelerations and decelerations, which still further disturb the driver in his efforts to pedal uniformly, by which buildup of the effects may occur.

The disadvantageous effects described above are generally not shown in the bicycles currently on the market, because they are equipped with a motor which is approximately in the power class of humans (250 W) and therefore does not have sufficient power reserves to display the phenomenon described above even at low velocities. The effects first occur when corresponding high-power motors are used, which may apply multiple times the power applied by humans, for example, in the case of bicycles a power of more than 1 kW, and/or a corresponding dimension for other vehicles. It is essential in the described embodiment variant that the main influencing variable for the controller of the motor is still the torque at the braking unit, which is applied by the person driving the vehicle, and/or a variable directly related to this torque, such as speed or power, and this value is subjected to a certain chronological smoothing, however. The time constant of the smoothing is to be approximately in the range of the duration of one typical crank revolution, i.e., in the order of magnitude of one second. Using the solution according to the present invention, uniform velocities are made possible in all velocity ranges, without neglecting the desired increase of the velocity (giving gas).

Various methods may be selected for implementing the smoothing. Firstly, the signal which simulates the instantaneous torque at the pedal crank may be smoothed by an analog low-pass filter. High frequencies from the irregularity of the torque at the pedal crank, which is caused by the differing lever ratios as a function of the angle, for example, are removed.

An alternative method is the method of sliding averages, which may be used in particular when the signal processing is performed digitally.

The calculation is performed as follows:

In general, the power P of the electric motor is a function of the power PT at the pedal crank:

$$PM = f(PT) \quad (1)$$

f indicating a predefined function.

Viewed chronologically, the following equation applies for the power P at the instant t:

$$PM(t) = f(PT(t), PT(t-1), \ldots PT(t-i) \ldots) \quad (2)$$

the influence of PT decreasing more and more with increasing time interval, i.e., greater i. The method of sliding averages uses a smoothed value GT for the power PT, which is calculated according to the following formula:

$$GT(t) = \alpha \cdot PT(t) + (1-\alpha) \cdot GT(t-1) \quad (3)$$

The parameter $\alpha$ controls the influence of the past, i.e., a value just below 1 means a very slight temporary smoothing, and a smaller value causes a stronger incorporation of the past and thus a stronger smoothing. If the individual values are taken every 10 ms, a value of $\alpha=0.04$ is an advantageous selection. The greater the chronological resolution, the smaller $\alpha$ is selected.

In the analog range, the effect described above is caused in a similar way by an integration element.

An alternative method for smoothing the control signals is the use of a capacitor connected in parallel to the motor, or alternatively to the generator, if a generator is provided. The capacitor acts similarly to a flywheel as an equalization element for the oscillating currents of the motor or the generator and equalizes the oscillations accordingly with correct dimensioning.

A further method for smoothing the control signals is obtained when a maximum velocity to be reached is established via a control lever, or also a handlebar throttle as is typical in motorcycles, which is not to be exceeded, independently of what power is produced by the pedals. At velocities below the maximum velocity, the power at the motor is produced proportionally to the power produced at the pedals, as soon as one in comes into or above the maximum velocity range just set, the power at the motor remains constant, as long as one does not fall below this range using the pedals. The maximum velocity range to be set may be set variably in any velocity range either continuously or step-by-step.

In a further embodiment variant of the present invention, the braking unit may comprise a generator. The current generated in the generator may be used for lighting or to be fed into the power accumulator, for example. In any case, however, the generator is only provided additionally to the actual mechanical or hydrodynamic brake.

Especially precise activation of the brake may be achieved in that the braking unit comprises a hydrodynamic brake An auxiliary use which further simplifies the operation of this vehicle according to the present invention may be achieved in that the control unit is also used for braking the vehicle.

Furthermore, it is especially advantageous if the braking unit is implemented as a combination of a mechanical brake and a hydrodynamic or electrical brake, and the mechanical brake is primarily used when starting or during strong accelerations, and the hydrodynamic or electrical brake is primarily used in continuous operation and during light accelerations or decelerations. This division into two parts corresponds to the different ability to control the braking systems, because mechanical brakes may be controlled punctually at very high torque, but run hot in the event of longer strain, while hydrodynamic or electrical brakes may be controlled less precisely, but are well suitable for continuous loads.

In the following, the present invention is explained in greater detail on the basis of exemplary embodiments illustrated in the figures.

DETAILED DESCRIPTION OF THE PREFERRED EMBODIMENTS

Figure 1:
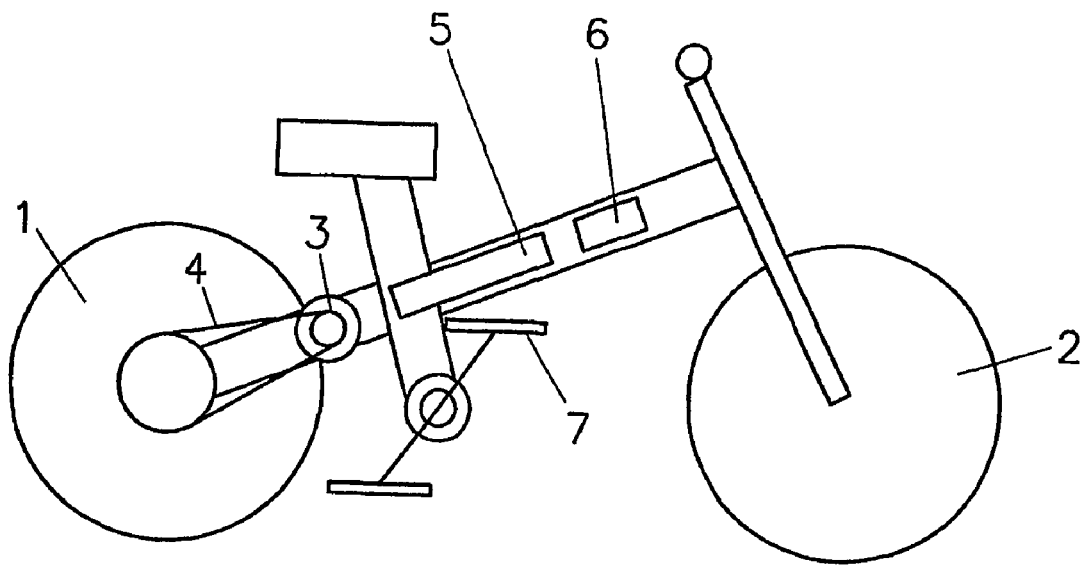
FIG. 1 shows the fundamental construction of a vehicle according to the present invention in a side view.

The vehicle is implemented as a bicycle, which has a rear wheel 1, which represents the drive wheel, and a front wheel 2 in the typical way. An electric motor 3 drives the rear wheel 1 via a chain 4. The electric motor 3 is supplied with power via a power accumulator 5 in the form of rechargeable batteries. A control unit 6 controls the electric motor 3 via a frequency converter, for example, so that a particular predefined travel velocity is reached.

As in a typical bicycle, a pedal crank 7 is provided, which is not mechanically connected to the drive wheel 1, however.

Figure 2:
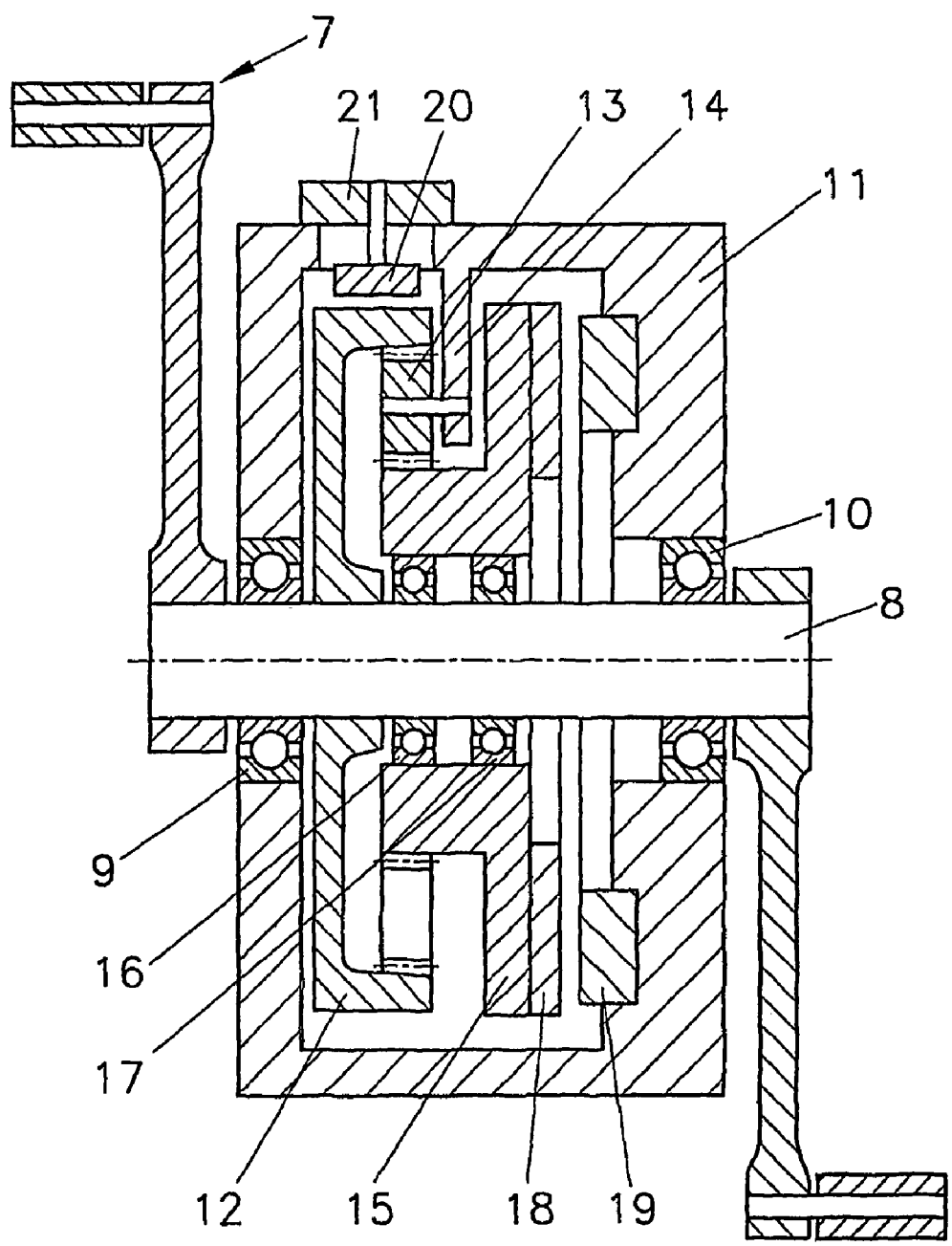
FIG. 2 shows a detail of FIG. 1 in section.

In FIG. 2, the mechanical construction in the area of the pedal crank 7 having a generator and an additional mechanical brake as a braking unit is shown in greater detail. The pedal crank 7 is fastened to a shaft 8, which is attached via bearings 9, 10 to a retainer 11 fixed on a housing. A hollow wheel 12 is connected rotationally fixed to the shaft 8, in which an intermediate gearwheel 13 engages, which is retained on a projection 14 of the retainer 11. The intermediate gearwheel 13 drives a flywheel 15 at a transmission ratio of approximately 3:1, which is mounted on the shaft 8 so it is rotatable via further bearings 16, 17. A disk rotor 16, 18 is attached to the flywheel 15, which works together with a fixed winding 19 and is used on one hand as a speed sensor, and on the other hand generates current, which may be fed to the consumers.

A brake shoe 20, which acts on the external peripheral surface of the hollow wheel 12 and may be engaged with variable adjusting force by an electromagnet 21, is schematically shown.

The control unit 6 operates as follows in this embodiment: the particular speed of the pedal crank 7 is detected via the disk rotor 18. The electric motor 3 is activated as a result in such a way that the speed of the drive wheel 1 is always at a fixed ratio to the speed of the pedal crank 7. This speed ratio may be adjusted either continuously or in predetermined steps by a lever (not shown) on the handlebars. Purely kinematically, the bicycle thus behaves exactly identically to a typical bicycle having gear shifting. The travel velocity is directly proportional to the speed of the pedal crank 7, the proportionality factor being a function of the particular selected gear. To be able to implement suitable and realistic feedback to the driver, the brake is controlled by the control unit 6 in such a way that the torque to be applied to the pedal crank is proportional to the torque applied to the drive wheel 1. This means that the power which the driver delivers to the bicycle at the pedal crank is proportional to the required propulsion power. If the proportionality factor was 1, the bicycle would behave in principle completely like a conventional bicycle. In practice, however, the proportionality factor is significantly less than 1, but greater than 0 and is 0.1, for example. This means that the power applied to the pedal crank 7 is a fraction, for example, a tenth, of the actual required power. The proportionality factor may also differ in the individual gears, so that if a larger transmission ratio is selected, i.e., a faster gear, a greater amplification factor is provided for the power.

Figure 3:
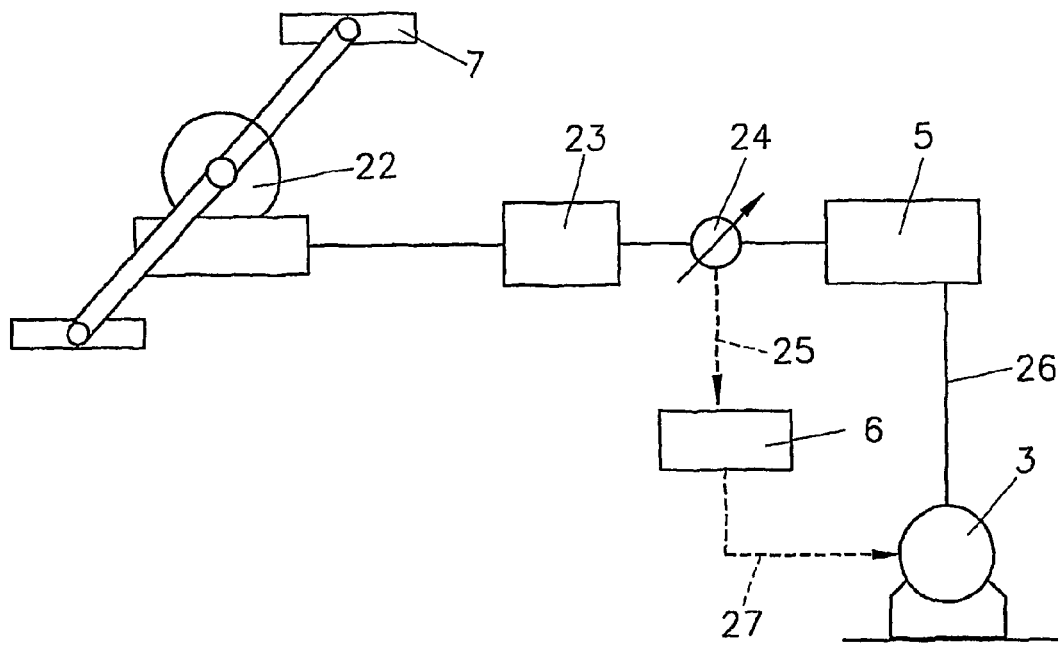
FIG. 3 shows an embodiment variant of the present invention in a circuit diagram.

FIG. 3 shows a possibility for implementing a circuit according to the present invention. A generator 22, which represents the braking unit here, is driven by the pedal crank 7. The current generated by the generator 22 is chronologically smoothed in a capacitor unit 23 and fed to the power accumulator 5. Before the power accumulator 5, the current is detected in a measuring unit 24, so that a corresponding control signal may be fed via a control line 25 to the control unit 6. The control unit 6 controls the electric motor 3, which drives the vehicle, via a further control line 27, the actual power supply from the power accumulator 5 occurring via a supply line 26.

Figure 4:
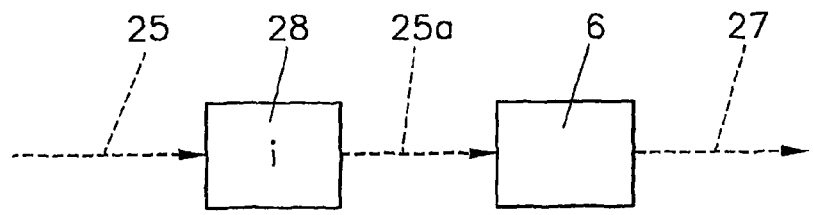
FIG. 4 and FIG. 5 show further embodiment variants of the present invention.

An alternative embodiment of the present invention is shown in detail in FIG. 4. A signal which is not yet smoothed (a capacitor configuration 23 or the like is not provided here) is fed to an integration element 28 via the control line 25 here. Via the continuation of the control line 25a, the control unit 6 is supplied with a signal to be able to deliver the actual control signals via the further control line 27. Instead of the integration element 28, a low-pass filter (not shown) may also be used.

Figure 5:
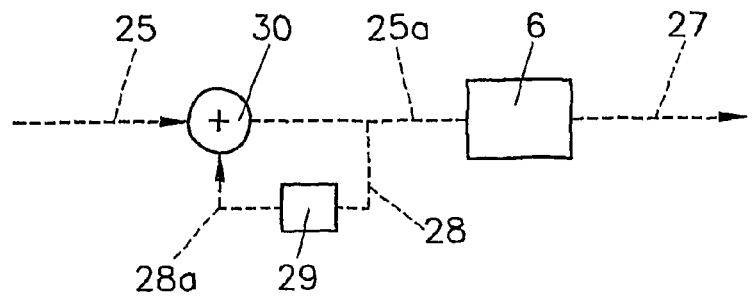

FIG. 5 shows an embodiment variant in which an addition element 30 is provided in the control line 25. The signal is taken from the continuation 25a downstream from the addition element 30 via a return line 28 and fed to a damping and delay element 29. The signal resulting therefrom is fed via the downstream line 28a to the addition element 30 as a second input signal. Chronological smoothing may also be caused by this circuit.

Through the solution according to the present invention, the drivability of the vehicle is significantly increased even at high powers of the motor, so that even for inexperienced individuals, easy and safe operation of the vehicle and maintaining uniform velocities are possible.

Using the present invention, it is possible to implement a bicycle which behaves in operation largely like a typical bicycle, with the difference that the power actually used for propulsion is amplified in relation to the power applied at the pedal crank 7. Therefore, a high travel velocity may be achieved with low bodily effort, without changing the fundamental behavior of the bicycle. In principle, it is to be noted that the properties described above, such as the proportionality of the speeds of pedal crank 7 and drive wheel 1, are only maintained as long as the power of the electric motor 3 is sufficient to implement the travel velocity predefined by the control unit 6. As soon as the electric motor 3 reaches its power limit 3, corresponding feedback may be delivered to the driver by additional resistance at the pedal crank 7. A special proximity to reality may thus be produced.

The invention claimed is:

1. A vehicle which comprises:
   a drive wheel,
   a motor connected to the drive wheel,
   a power accumulator for supplying power to the motor, a pedal crank which is independently movable relative to the drive wheel, a control unit for controlling the motor, a braking unit which is controlled by the control unit and provides a resistance torque opposing rotation of the pedal crank, and wherein the control unit is implemented in such a way that a ratio of the speed of the pedal crank to a speed of the drive wheel is constant step-by-step.

2. The vehicle according to claim 1, wherein the braking unit comprises a flywheel.

3. The vehicle according to claim 2, wherein the flywheel is connected to the pedal crank via a gear which increases the speed and which has a transmission ratio of at least 1:3.

4. A vehicle which comprises:

a drive wheel, a motor connected to the drive wheel, a power accumulator for supplying power to the motor, a pedal crank which is independently movable relative to the drive wheel, a control unit for controlling the motor, a braking unit which is controlled by the control unit and provides a resistance torque opposing rotation of the pedal crank, and wherein the control unit is implemented in such a way that a ratio of the speed of the pedal crank to speed of the drive wheel corresponds variably to a predefined value step-by-step.

5. A vehicle which comprises:

a drive wheel, a motor connected to the drive wheel, a power accumulator for supplying power to the motor, a pedal crank which is independently movable relative to the drive wheel, a control unit for controlling the motor, a braking unit which is controlled by the control unit and provides a resistance torque opposing rotation of the pedal crank, and wherein the control unit is implemented to keep the power applied at the pedal crank at a constant ratio to the power delivered at the drive wheel.

6. The vehicle according to claim 5, wherein the control unit controls the motor as a function of torque instantaneously applied using the pedal crank and/or a variable related thereto, such as power or speed, using chronological smoothing.

7. The vehicle according to claim 6, wherein the smoothing only compensates for unintended short oscillations caused over one rotation by alternating load of the human legs, but recognizes intentional accelerations or velocity reductions and implements them immediately.

8. The vehicle according to claim 7, wherein the chronological smoothing is implemented by an analog low-pass filter in the control unit.

9. The vehicle according to claim 8, wherein the chronological smoothing is digitally implemented by calculating a sliding average in relation to the instantaneously applied torque using the pedal crank.

10. The vehicle according to claim 8, wherein the chronological smoothing is implemented by an integration element in the control unit.

11. The vehicle according to claim 8, wherein the chronological smoothing is implemented by establishing a continuous or step-by-step variable highest velocity, which is set via a control lever or a handlebar throttle.

12. The vehicle according to claim 11, wherein the motor is implemented as an electric motor, and the chronological smoothing is implemented by a capacitor which is connected in parallel to the electric motor and/or to the generator.

13. The vehicle according to claim 12, wherein the resistance torque of the braking unit is controlled by the control unit.

14. The vehicle according to claim 13, wherein the motor is implemented as an electric motor, and a power accumulator is provided for supplying the electric motor.

15. The vehicle according to claim 13, wherein the motor is implemented as an internal combustion engine having internal combustion.

16. The vehicle according to claim 15, wherein the braking unit comprises a generator.

17. The vehicle according to claim 16, wherein the generator is activated by the control unit.

18. The vehicle according to claim 17, wherein the braking unit comprises a hydrodynamic brake.

19. The vehicle according to claim 17, wherein the braking unit comprises a mechanically acting brake.

20. The vehicle according to claim 19, wherein the control unit is also used for braking the vehicle.

21. The vehicle according to claim 20, wherein the braking unit is implemented as a combination of a mechanical brake and a hydrodynamic or electrical brake, and the mechanical brake is primarily used when starting or in the event of strong accelerations, and the hydrodynamic or electrical brake is primarily used in continuous operation and in the event of light accelerations or decelerations.

22. The vehicle according to claim 4, wherein the braking unit comprises a flywheel.

23. The vehicle according to claim 22, wherein the flywheel is connected to the pedal crank via a gear which increases the speed and which has a transmission ratio of at least 1:3.

24. The vehicle according to claim 5, wherein the braking unit comprises a flywheel.

25. The vehicle according to claim 24, wherein the flywheel is connected to the pedal crank via a gear which increases the speed and which has a transmission ratio of at least 1:3.

* * * * *